May 15, 1928.  
E. F. LUNKEN  
1,669,419
NOZZLE
Filed June 22, 1927
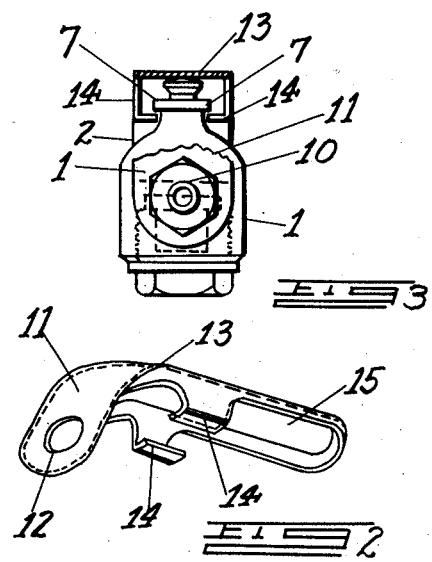
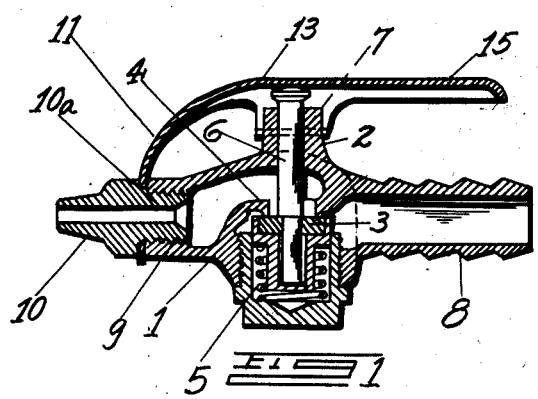
INVENTOR.
Eshelby F. Lunken
BY
Allen & Allen
ATTORNEYS.

Patented May 15, 1928.

1,669,419

UNITED STATES PATENT OFFICE.

ESHELBY F. LUNKEN, OF CINCINNATI, OHIO, ASSIGNOR TO THE LUNKENHEIMER COMPANY, OF CINCINNATI, OHIO, A CORPORATION OF OHIO.

NOZZLE.

Application filed June 22, 1927. Serial No. 200,697.

My invention relates to nozzles and more particularly to air nozzles, and to the provision of an inexpensive and effective way of operating the nozzle valves therein.

It is the object of my invention to provide a simple structure for depressing and releasing the spring plunger of a valve, in which preferably a single metal stamping is employed, said stamping held in place without extra fittings, and by its own resiliency providing for a suitable movement away from operating position.

In an air nozzle, or other pressure fluid nozzles, it is customary to have a valve body on the end of which is a nozzle. In the instance of my invention the nozzle itself is preferably removable, and it is my object to fasten the operating lever for the valve in place by means of the nozzle itself.

Also it is my object to keep the lever in position and permit freedom of movement by forming a suitable flanged projection or projections on the portion of the valve body through which the valve stem projects, and sliding the lever over the said projections, thus permitting a downward and upward movement of the lever, bending at some intermediate point, and returning of its own resiliency.

I thus avoid the necessity of providing for a pivoting device for sustaining the handle or lever, and avoid the necessity of the spring on the valve, returning the handle itself to its inoperative position.

I accomplish my objects by that certain construction and arrangement of parts to be hereinafter more specifically pointed out and claimed.

In the drawings, Figure 1 is a central longitudinal section of the device.

Figure 2 is a perspective of the operating handle.

Figure 3 is an end elevation of the device.

I have illustrated a valve body at 1, having a projection or boss 2 through which the stem of the valve projects. The valve 3 seating at 4, with a spring 5, is the usual type of valve for an air nozzle, and any other suitable type of valve and seat, and body can be substituted for the one shown. The boss through which the stem 6 of the valve projects is formed with a pair of ribs or lugs 7, 7, at each side thereof.

The valve body terminates in a house coupling element 8, at one end, and at the other is provided with a threaded hole 9 for the nozzle. The nozzle is in the form of a piece 10, having a threaded end 10ª of a size reduced over the neighboring portions of the piece which end threads into the hole 9.

The valve operating lever is in the form of a piece of sheet brass or whatever metal is desired, bent to present a tongue 11, which is perforated with a hole 12, that is set over the threaded end of the nozzle, whereupon the nozzle is screwed into the valve body, thus holding the lever in place.

The lever tongue is curved, as shown, and the central portion 13, is formed with inturned flanged portions 14, which are set beneath the ribs or shoulders 7 on the boss of the valve body. The central portion of the lever thus lies over the end of the valve stem, and the lever cannot shift sidewise on account of the engagement over the ribs on the boss. The flanges on the lever, are however, so arranged that the central portion of the lever can move up and down.

The lever terminates in a handle portion 15, which lies out over the hose coupling end of the valve body.

In operation the user depresses the handle portion of the lever, which bends the lever at its tongue portion, thus depressing the valve, and permitting the fluid under control to pass out through the nozzle. When the handle portion of the lever is released, the lever will spring back to its original position, which releases the valve stem, so that the spring for the valve will thrust up the stem, thus closing the flow of fluid through the device.

It will be noted that the lever can be made simply of one piece of metal, that it is held in place by the nozzle, although a nut would serve the same purpose, with added expense, and that the lever operates satisfactorily without calling upon the spring of the valve to do any service.

Having thus described my invention, what I claim as new and desire to secure by Letters Patent is:

1. In a nozzle, the combination with a valve containing body having a threaded nozzle therein, and having a projecting valve stem, whereby the valve is operated, a resilient lever for operating the valve, said lever held in place on the body by the nozzle.

2. In a nozzle, the combination with a valve containing body having a threaded nozzle therein, and having a projecting valve stem, whereby the valve is operated, a resilient lever for operating the valve, said lever held in place on the body by the nozzle and means for preventing lateral movement of the lever with relation to the valve stem.

3. In a nozzle, the combination with a valve containing body having a threaded nozzle therein, and having a projecting valve stem, whereby the valve is operated, a resilient lever for operating the valve, said lever held in place on the body by the nozzle and having a loose flanged engagement with the portion of the valve body about the projecting stem.

4. In a nozzle, the combination with a valve containing body having a boss through which the valve stem will project, lugs on said boss, a resilient lever for operating the valve stem, formed of one piece of metal, means for removably mounting the lever at a fixed point forward of the boss, and means on the lever engaging over the sides of the lugs on the boss to prevent lateral movement of the lever.

5. In a nozzle, the combination with a valve containing body having a boss through which the valve stem will project, lugs on said boss, a resilient lever for operating the valve stem, formed of one piece of metal, means for removably mounting the lever at a fixed point forward of the boss, and means on the lever engaging over the sides of the lugs on the boss to prevent lateral movement of the lever, said means on the lever also bent under the lugs so as to engage them from beneath, with sufficient freedom of play to permit of resilient movement of the lever.

6. In a nozzle, the combination with a valve containing body having a boss through which the valve stem will project, lugs on said boss, a resilient lever for operating the valve stem, formed of one piece of metal, means for removably mounting the lever at a fixed point forward of the boss, and means on the lever engaging over the sides of the lugs on the boss to prevent lateral movement of the lever and said valve stem having spring means opposing its unseated position, independent of the action of the lever.

7. In a nozzle, the combination with a valve containing body, a spring impelled stem for the valve extending therefrom, a resilient metal piece serving as a lever, means for securing one end of the lever in a fixed position, means for retaining the lever against shifting from said fixed position, at a point adjacent the valve stem, said second means being arranged to permit a flexing of the resilient piece to depress the stem.

8. In a nozzle, the combination with a valve containing body, and a valve having a nozzle secured in said body, of a lever for operating the valve comprising a single piece of resilient metal, having terminal engagement with the body, in the portion in which said nozzle is secured in said body and said piece having a loose engagement with the portion of the body about the stem of the valve.

ESHELBY F. LUNKEN.